United States Patent
Qiu et al.

(10) Patent No.: US 8,599,698 B2
(45) Date of Patent: Dec. 3, 2013

(54) NETWORK ROUTING METHOD AND APPARATUS

(75) Inventors: Baojian Qiu, Shenzhen (CN); Qimin Xiang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 329 days.

(21) Appl. No.: 13/185,651

(22) Filed: Jul. 19, 2011

(65) Prior Publication Data

US 2012/0008503 A1  Jan. 12, 2012

Related U.S. Application Data

(63) Continuation of application No. PCT/CN2009/074081, filed on Sep. 21, 2009.

(30) Foreign Application Priority Data

Jun. 11, 2009 (CN) .......................... 2009 1 0149023

(51) Int. Cl.
*H04L 12/26* (2006.01)

(52) U.S. Cl.
USPC .......................................................... 370/238

(58) Field of Classification Search
None
See application file for complete search history.

(56) References Cited

U.S. PATENT DOCUMENTS

| | | | |
|---|---|---|---|
| 7,924,713 B2 * | 4/2011 | Porat et al. ..................... | 370/230 |
| 2002/0067693 A1 * | 6/2002 | Kodialam et al. ............. | 370/216 |
| 2004/0233850 A1 * | 11/2004 | Randriamasy et al. ........ | 370/238 |
| 2005/0243723 A1 * | 11/2005 | Randriamasy ................. | 370/235 |
| 2006/0050635 A1 * | 3/2006 | Yamada et al. ................ | 370/229 |
| 2008/0144510 A1 * | 6/2008 | Harrabida et al. ............. | 370/236 |
| 2010/0027420 A1 * | 2/2010 | Smith ............................. | 370/235 |

* cited by examiner

*Primary Examiner* — Otis L Thompson, Jr.
(74) *Attorney, Agent, or Firm* — Christopher P. Maiorana, PC (57) ABSTRACT

The present invention discloses a network routing method and apparatus. In the network routing method, for multiple selectable paths corresponding to current service, an average utilization rate of links of a whole network is calculated according to a bandwidth utilization rate of each link before bearing the current service and the number of the links in the whole network, wherein each of the selectable paths includes at least one link; for each link in each of the selectable paths, a bandwidth utilization rate of each link after bearing the current service is calculated; for each link in each of the selectable paths, a link balanced weight for each link is set according to the bandwidth utilization rate of said link after bearing the current service and the average utilization rate of the links of the whole network; and the link balanced weight of each link included in each of the selectable paths is accumulated respectively to obtain accumulated loads, and a path with the minimum accumulated load is selected as a bearing path for bearing the current service. The technical solution according to the present invention can improve the efficiency and realize the balanced load among the links of the whole network.

13 Claims, 3 Drawing Sheets

NETWORK ROUTING METHOD AND APPARATUS

This is a continuation of International Application PCT/CN2009/074081, with an International Filing Date of Sep. 21, 2009, which claims priority to Chinese Application No. 200910149023.8, filed Jun. 11, 2009, each of which is incorporated by reference.

FIELD OF THE INVENTION

The present invention relates to the field of communications, and in particular to a network routing method and apparatus.

BACKGROUND OF THE INVENTION

Automatic switched optical network (ASON) is a new generation optical network which realizes an automatic switching function under the control of routing and signaling, and is a standardized intelligent optical transport network. The ASON introduces an independent control plane on the basis of the original management plane and transport plane of the conventional synchronous digital hierarchy (SDH) network, and introduces the signaling and routing into a transport network for the first time, so as to converge three fields of switching, transporting and data by establishing a call and a connection via the intelligent control plane, and therefore achieve a routing setting, an end-to-end service dispatching and an automatic network recovery.

The Constrained Shortest Path First (CSPF) algorithm is one of path algorithms that are frequently used in the field of ASON. Typically, when the CSPF algorithm is used to calculate a path, the minimum weight path is obtained by accumulating link weights configured by a network manager based on the Dijkstra algorithm, or the only factor taken into consideration is to reduce the hops to the least, which generally leads to an over-centralization on some links and a consequent unbalanced distribution of network traffic in the whole network. Therefore, it is a possible consequence that, on the one hand, some certain links bear excessive services; on the other hand, the majority of the other links are in idle state.

In order to achieve a balanced load, a great many of theoretical algorithms can be employed to select a network path, such as the round-robin algorithm, the least-connection algorithm, the response time algorithm, the hash algorithm, the least connection error algorithm, the link bandwidth algorithm and so on. At present, the simplest method for realizing the balanced load based on the link bandwidth algorithm is to perform a simple weighting processing on a link, that is, increase the weight of each link on the path through which an established service passes by 50 or 100, and select the minimum weight link in the next path calculation, so as to avoid multiple services passing through the same path effectively.

In related art, the Chinese patent application No. CN200810116520.3 has proposed a method for realizing the balanced load. In the method, a load index is introduced to select an optimal path from multiple non-intersected paths. The method has taken into consideration the bandwidth of the whole path rather than the bandwidth of a single link. Although the method possesses the characteristic of macroscopically and comprehensively planned, its realization is complicated. The method requires executing the Dijkstra algorithm for many times to calculate the non-intersected paths based on a new network topology structure, therefore, the realization of the algorithm is of high complexity and the efficiency is low. Furthermore, the method takes the selectable bandwidth of the link in a path with the minimum selectable bandwidth as the maximum bearable load of the path, whereas the influence of the selectable bandwidths of the other links in the path on the load of the whole network is not taken into full consideration. Therefore, the method sonly realizes the balanced load among paths rather than among the links of the whole network.

SUMMARY OF THE INVENTION

Aiming at the problems that the network routing solution of the relate art for realizing the balanced load is complicated in algorithm and low in efficiency and is incapable of realizing the balanced load among the links of the whole network, the present invention is proposed with a main object of providing an improved network routing solution for solving at least one of the problems above.

According to an aspect of the present invention, a network routing method is provided.

The network routing method according to the present invention comprises the following steps that: for multiple selectable paths corresponding to current service, an average utilization rate of links of a whole network is calculated according to a bandwidth utilization rate of each link before bearing the current service and the number of the links in the whole network, wherein each of the selectable paths includes at least one link; for each link in each of the selectable paths, a bandwidth utilization rate of each link after bearing the current service is calculated; for each link in each of the selectable paths, a link balanced weight for each link is set according to the bandwidth utilization rate of said link after bearing the current service and the average utilization rate of the links of the whole network; and the link balanced weight of each link included in each of the selectable paths are accumulated respectively to obtain accumulated loads, and a path with the minimum accumulated load is selected as a bearing path for bearing the current service.

According to another aspect of the present invention, a network routing apparatus is provided.

The network routing apparatus according to the present invention comprises a first calculation unit, a second calculation unit, a third calculation unit, an accumulator, and a path selection unit, wherein the first calculation unit is adapted to calculate an average utilization rate of links of a whole network according to a bandwidth utilization rate of each link before bearing current service of multiple selectable paths corresponding to the current service and the number of the links; the second calculation unit is adapted to calculate a bandwidth utilization rate of each link after bearing the current service; the third calculation unit is adapted to calculate a link balanced weight for each link according to the bandwidth utilization rate after bearing the current service and the average utilization rate of the links of the whole network; the accumulator is adapted to accumulate the link balanced weight of each link included in each of the selectable paths to obtain accumulated loads; and a path selection unit is adapted to select a path with the minimum accumulated load as a bearing path for bearing the current service.

The present invention provides a network routing solution for realizing link bandwidth load balance based on an average bandwidth utilization rate of the whole network, which adopts a manner of setting a balanced weight on links, i.e., service loads is balancedly distributed on each data link by setting a link with a heavy load with a large weight value and a link with a light load with a small weight value, so as to realize the balanced load on the whole network. Therefore, the solution of the present invention solves the problems that the network routing solution of the relate art for realizing the balanced load is complicated in algorithm and low in efficiency and is incapable of realizing the balanced load among the links of the whole network, and consequentially improves the efficiency and realize the balanced load among the links of the whole network.

Other features and advantages of the present invention will be described in the following specification, and will be partly obvious from the specification, or may be understood by implementing the present invention. The object and other advantages of the present invention can be achieved and obtained by the specific structures illustrated in the specification, claims and the accompanying drawings.

BRIEF DESCRIPTION OF THE DRAWINGS

The accompanying drawings illustrated herein are provided for further understanding of the present invention, and form a part of the application, and the exemplary embodiments of the present invention and the description thereof are illustrative for explaining the present invention rather than limiting the present invention. In the accompanying drawings.

DETAILED DESCRIPTION OF THE EMBODIMENTS

Function Summary

When multiple services require to be borne in network links, network traffic may excessively centralize on some links, which leads to a network congestion phenomenon. Therefore, it is required to provide a network routing method to realize a balanced load in a whole network. An improved network routing method is provided according to an embodiment of the present invention, which is on the basis of parameters configured by a management plane, and in which a control plane calculates, according to utilization condition of a link bandwidth, a path with the minimum current load by one path calculation process based on the Dijkstra algorithm. A link load is represented with a link balanced weight, i.e., a link weight, wherein a link with a heave load is assigned with a large weight and a link with a light load is assigned with a small weight. During the calculation of the link balanced weight, the bandwidth of each link is comprehensively considered in the whole network to realize a dynamic adjustment on the link balanced weight, therefore, not only the bandwidth utilization rate of the current link is considered but also average bandwidth utilization rate of all the links in the whole network is compared, and then the weight of each link is acquired according to the contrast coefficient of the average bandwidth utilization rate of the whole network to the bandwidth utilization rate of each link. When bearing a service, the network selects a path with the minimum load using the aforementioned method so that multiple service loads can be balancedly distributed on each data link to realize a balanced load among all the links in the whole network.

It should be noted that the embodiments of the present invention and the features thereof can be combined with each other if no conflict is caused. The present invention will be described in detail hereinafter by reference to the accompanying drawings in conjunction with exemplary embodiments.

Method Embodiments

A network routing method is firstly provided according to an embodiment of the present invention, which can realize the balanced load both in a single domain and on an inter-domain link.

Figure 1:
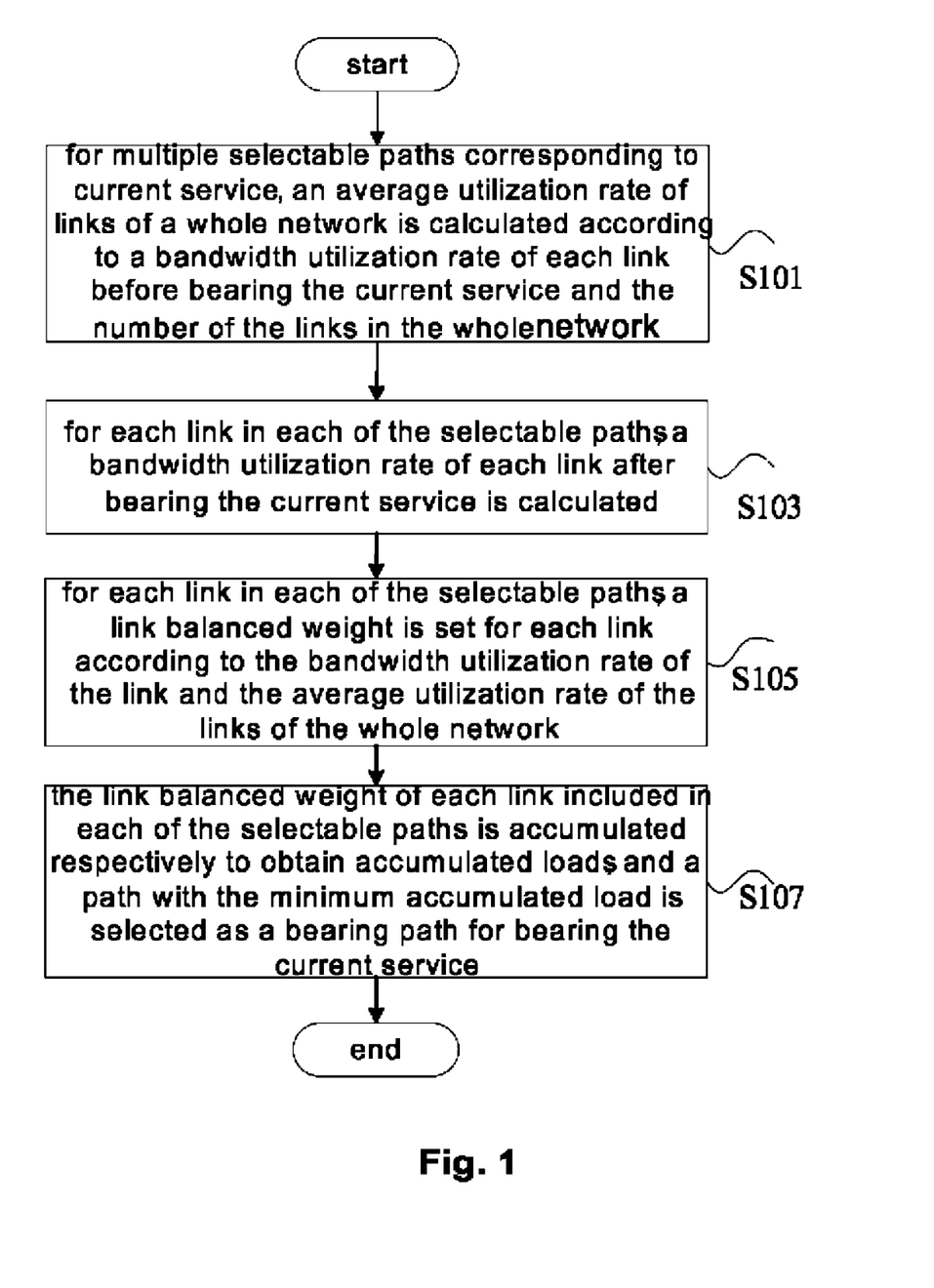
FIG. 1 is a flow chart of a network routing method according to an embodiment of the present invention.

FIG. 1 is a flow chart of the network routing method according to the embodiment of the present invention. As shown in FIG. 1, the network routing method according to the embodiment of the present invention comprises the followings steps (step S101-step S111).

Step S101: for multiple selectable paths corresponding to current service, an average utilization rate of links of a whole network is calculated according to a bandwidth utilization rate of each link before bearing the current service and the number of the links in the whole network, wherein each of the selectable path includes at least one link.

In the specific implementation process, multiple paths are provided for multiple services. For each service, it is required to select an optimal path to bear the service based on the consideration of a balance in the whole network. Preferably, according to a source node and a destination node of each service, a path corresponding to the service with the minimum load is found from the multiple selectable paths, wherein each path includes one or more links for bearing the service.

In a comprehensive view of the load of the whole network, the average utilization rate of the links of the whole network is introduced which is obtained by accumulating the bandwidth utilization rate of each link of the multiple selectable paths before the service is borne and dividing the accumulated value by the number of the links in the whole network. It can be easily understood that in the specific implementation process, the average utilization rate of the links of the whole network is 0 if the service is the first one accessed after the network is initialized.

The following description is given by reference to an example embodiment. A network is modeled to a directed weighted diagram: G=(V, E), wherein V and E represent a node set and a link set respectively, the number of nodes is n, and the number of the links included in the multiple paths is m. For each link $(i,j) \in E$, $C_{ij} \to R+$ represents a total bandwidth of the link, $R_{ij} \to R+$ represents a residual bandwidth of the link, and R+ represents a set of positive real numbers.

For a new service, a call request of the new service is represented with (s, d, b), wherein s and d respectively represent a source node and a destination node, and b represents a bandwidth requested by the call request. Multiple paths between the given source node s and the given destination node d is found, and the multiple paths form a set s, d={P1, P2, . . . , Pi}, wherein P1, P2, . . . , Pi represents all paths corresponding to the service.

According to the description of the above parameters, preferably, the average utilization rate of the links of the whole network can be calculated by the following formula (1):

$$\overline{U} = \left[\sum_{(i,j \in E)} (1R_{ij}/C_{ij}) \times 100\right] \Big/ m \qquad 1$$

wherein $\overline{U}$ represents the average utilization rate of the links of the whole network, m represents the number of the links in the whole network, $R_{ij}$ represents a residual bandwidth of a link, and $C_{ij}$ represents the maximum bandwidth of the link.

Step S103, for each link in each of the selectable paths, a bandwidth utilization rate of each link after bearing the current service is calculated.

In order to assign each link in the multiple selectable paths bearing the service with a balanced weight subsequently, the bandwidth utilization rate of each link in each path after bearing the service need to be calculated. Therefore, a link bandwidth utilization rate calculation solution is provided according to an embodiment of the present invention which will be described in combination with the aforementioned parameters.

Preferably, the bandwidth utilization rate of each link in each path after bearing the service can be calculated by the following formula (2):

$$U_{ij} = \begin{cases} [1(R_{ij}b)/C_{ij}] \times 100 & b \leq R_{ij} \\ \text{MAX\_VALUE} & b > R_{ij} \end{cases} \qquad 2$$

wherein $U_{ij}$ represents the bandwidth utilization rate of a link after bearing a service; $R_{ij}$ represents a residual bandwidth of the link; $C_{ij}$ represents the maximum bandwidth of the link; b represents a bandwidth requested by the service; and MAX_VALUE represents a predetermined fixed value (an integer more than 100), wherein $R_{ij}$, $C_{ij}$, and b are all nonnegative numbers.

In the formula (2), ($R_{ij}$ b) represents a residual bandwidth of the link after bearing the service, therefore, the formula (2) expresses the bandwidth utilization rate of the link after bearing the service. While in formula (1), the accumulated link bandwidth utilization rate (1 $R_{ij}/C_{ij}$)*100 represents the bandwidth utilization rate of the link before bearing the service. The specific expression forms of the formula (1) and formula (2) are not limited to those illustrated herein and can be changed according to specific situations.

The link bandwidth utilization rate reflects the bandwidth utilization condition of a certain link and also generally reflects the load of the link. When $U_{ij}$ is small and the load of the link is light, there is much bandwidth available for the link between nodes i and j, and consequentially, there is sufficient bandwidth available after a new connection is accepted on the link and no influence is caused on the acceptance of a new connection request in future. If the bandwidth available for the link between nodes i and j is approximate to the bandwidth requested by the connection, another connection request passing through the link will be hardly accepted after this connection is accepted on the link.

In order to achieve the balanced load in the whole network, it is required to assign dynamically a balanced weight to each link of the multiple selectable paths capable of bearing a service, and the balanced weights are accumulated to acquire a path with the minimum weight as the path to bear the service. This process is illustrated by the following steps S105-step S109.

Step S105, for each link in each of the selectable paths, a link balanced weight is set for each link according to the bandwidth utilization rate of the link after bearing the current service and the average utilization rate of the links of the whole network.

In the specific implementation process, the average utilization rate of the links of the whole network and the bandwidth utilization rate of the link after bearing the service are respectively calculated according to the above formula (1) and formula (2), and then the balanced weight of each link included in the multiple paths is set according to the two calculation results.

Preferably, the link balanced weight is set by the following formula (3):

$$W_{ij} = \begin{cases} W_0 & (U_{ij} \leq U_0) \\ aU_{ij} & (U_{ij} > U_0, \text{ and } U_{ij} \leq \overline{U}) \\ bU_{ij} & (U_{ij} > U_0, \text{ and } U_{ij} > \overline{U}) \\ \text{MAX\_VALUE} & (U_{ij} > 100) \end{cases} \qquad 3$$

wherein $W_{ij}$ represents the link balanced weight, $U_0$ represents an initial threshold of the link bandwidth utilization rate, $W_0$ represents a predetermined initial value of the link balanced weight, $U_0$, $W_0$, a and b are all nonnegative numbers, and a $W_0/U_0$ and b>a.

In the formula (3), the link balanced weight is assigned to each link in the following four ways. If the link bandwidth utilization rate of the current link is low ($U_{ij} \leq U_0$), the current link is assigned with the predetermined initial value (i.e., $W_0$) of a small link balanced weight; if the load of the current link is above the initial threshold of the link bandwidth utilization rate but below the average utilization rate of the links of the whole network, then the weight of the link is set to be slowly increased with the increase of the link bandwidth utilization rate, wherein the increase coefficient is a which is a small positive number; if the load of the current link is beyond the average load of the whole network, then the weight of the link is set to be rapidly increased with the increase of the link bandwidth utilization rate, wherein the increase coefficient is b which is a larger positive number with respect to a; and specifically, if the current link lacks sufficient bandwidth ($U_{ij}$>100), then the predetermined fixed maximum value (MAX_VALUE) is taken as the balanced weight of the link, which indicates the link unavailable.

Step S107, the link balanced weight of each link included in each of the selectable paths is accumulated respectively to obtain accumulated loads, and a path with the minimum accumulated load is selected as a bearing path for bearing the current service.

In this step, the Dijkstra algorithm provided by the CSPF is preferably employed. The link balanced weight of each link included in each path is accumulated to obtain the accumulated weight (i.e., the accumulated load) of each path.

Preferably, the accumulated loads of the paths resulting from the calculation of the step S107 are compared to select the bearing path with the minimum accumulated load as the path for bearing the service.

The above step S101-step S107 illustrate the network routing method aiming at one service (i.e., the current service) request. When there are N service requests, the bearing path of each service can be selected by calculations according to the above steps.

Figure 2:
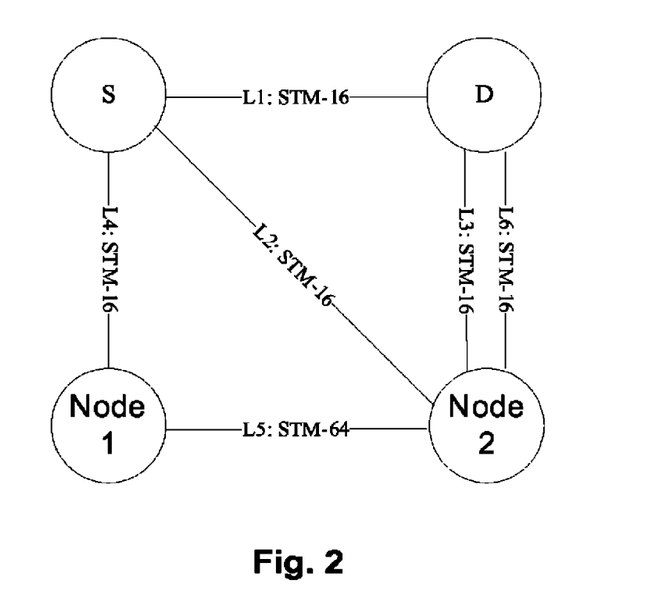
FIG. 2 is a schematic diagram of a network link according to an embodiment of the present invention.

FIG. 2 is a schematic diagram of a network link according to an embodiment of the present invention. As shown in FIG. 2, a network including four nodes is taken as an example, wherein the four nodes are node S, node D, node 1 and node 2. According to this example, the network links include L1, L2, L3, L4, L5 and L6, wherein L1 is connected with the node S and the node D, L2 is connected with the node S and the node 2, L3 is connected with the node 2 and the node D, L4 is connected with the node S and the node 1, L5 is connected with nodes 1 and 2, and node 6 is connected with the node 2 and the node D. In the network links, L1, L2, L3, L4 and L6 are all links of STM-16 with a total bandwidth of 16 VC4, L5 is a link of STM-64 with a total bandwidth of 64 VC4, wherein VC4 represents a bandwidth unit. An initial threshold U0 of a link bandwidth utilization rate is set as 25, an initial threshold $W_0$ of a link weight is set as 10, a is set as 0.5, and b is set as 1.

The following will describe respectively path selection for each service request by calculation.

1. A service from the node S to the node D is established which requests a bandwidth of 1 VC4. In this case, a flow of a network routing is as follows.

(1) According to the formula (1), it is calculated that current bandwidth utilization rate of each link is 0 (because each link bears no service currently), and then the bandwidth utilization rate of each link is summed and then the summed result is averaged to obtain that an average bandwidth utilization rate of the whole network is 0.

(2) The Dijkstra algorithm is run to traverse the links of the whole network. If the service passes through the link, then the link bandwidth utilization rate of the link L1 is calculated as $[1-(16-1)/16]\times 100=6$ according to the formula (2). Similarly, the bandwidth utilization rates of the other links are obtained respectively as: L2:6, L3:6, L4:6, L5:2, L6:6.

(3) According to the formula (3) and the calculation results of step (1) and step (2), since the bandwidth utilization rate of each link is less than a threshold 25, the balanced weight of each link is 10.

(4), The shortest path from the source node S to the destination node D is calculated, and the weights are accumulated and compared.

It can be concluded from the above steps that the path with the minimum load is the path which passes through the link L1. Then the present path calculation is ended.

2. The second to the fourth services from the node S to the node D are established, wherein each of the services requests a bandwidth of 1 VC4. The steps (1)-(4) in the above case 1 are repeated to obtain that the bandwidth utilization rate of each link is still equal to or less than the threshold 25, therefore, the balanced weight of each link is still 10, and the path with the minimum load is still the path passing through the link L1.

3. The fifth service from the node S to the node D is established, which requests a bandwidth of 1 VC4. In this case, a flow of a network routing is as follows.

(1) According to the formula (1), the current bandwidth utilization rate of the link L1 is calculated as $[1-(12/16)]\times 100=25$, the bandwidth utilization rates of the other links are 0, the total number of the links is 6, and the average bandwidth utilization rate is 4.

(2) If the service passes through the link, the bandwidth utilization rate of the link L1 is calculated as $[1-(12-1)/16]\times 100=$ according to the formula (2). Similarly, the bandwidth utilization rates of the other links are respectively calculated as: L2:6, L3:6, L4:6, L5:2, L6:6.

(3) The balanced weight of each link is respectively calculated according to the formula (3) and is obtained as: L1:31, L2 L6:10.

(4) The weights are accumulated and compared to obtain that the path with the minimum load is: the node S->the node 2->the node D, i.e., path L2-L3.

4. The sixth to the eighth services from the node S to the node D are established. The steps (1)-(4) in the case 3 are repeated to obtain that: the balanced weight of the link L1 is still 31, the balanced weights of the links L2-L6 are all 10, and the service still passes through the path of the node S->the node 2->the node D and still passes through the links L2 and L3.

5. The ninth service from the node S to the node D is established which requests a bandwidth of 1 VC4. In this case, a flow of a network routing is as follows.

(1) According to the formula (1), the current bandwidth utilization rate of the link L1 is calculated as $[1-(12/16)]\times 100=25$. Similarly, the current bandwidth utilization rates of the other links are respectively calculated as: L2:25, L3:25, L4:0, L5:0, L6:0, therefore, the average bandwidth utilization rate is 13.

(2) According to the formula (2), if the service passes through the link, then the bandwidth utilization rate of the link L1 is calculated as $[1-(12-1)/16]\times 100=31$ according to the formula (2). Similarly, the bandwidth utilization rates of the other links are respectively calculated as: L2:31, L3:31, L4:6, L5:2, L6:6.

(3) According to the formula (3), the balanced weight of each link is calculated as: L1:31, L2:31, L3:31, L4:10, L5:10, L6:10.

(4) The weights are accumulated and compared to obtain that the path with the minimum load currently is: the node S->the node 1->the node 2->the node D, i.e., the path passes through the links L4, L5 and L6.

6. The tenth-twelfth services from the node S to the node D are established. The steps (1)-(4) in the case 5 are repeated to obtain that the path with the minimum load is still the node S->the node 1->the node 2->the node D, i.e., the path passes through the links L4, L5 and L6.

7. After the above steps, each link bears 4 services, so as to realize the balanced distribution of the services on each link. Then, the thirteenth service from the node S to the node D is established which requests a bandwidth of 1 VC4. The steps of the network routing are repeated according to the formula (1), the formula (2) and the formula (3), then it is obtained that the path for bearing the thirteenth service is the link L1. Then, the above steps of the network routing are repeated in the network routing flow requested by other service. If the load balancing method described in the present invention is replaced with a method in which weights are configured by a network manager and then accumulated to calculate the minimum weight, then the link L1 is always selected to bear services, which increases the burden of the link L1, severely unbalances the load of the whole network, and increases the service risk at the same time. Since if the link L1 is disconnected, all the services borne by the link L1 will be interrupted, which cause a great loss to the customer.

By means of the above embodiments, the services are balancedly distributed on each link and each link bears balancedly the network traffic, so that a load balance is achieved in the whole network, the service risk is equally distributed, and the network traffic is consequentially balanced and effectively controlled.

Figure 3:
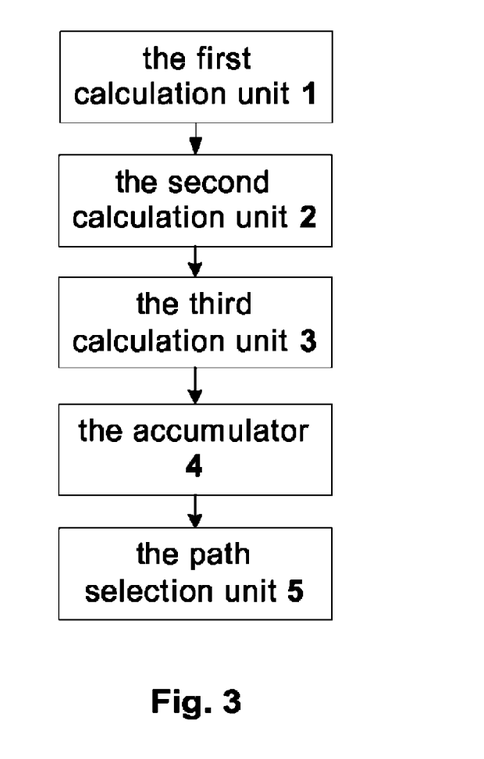
FIG. 3 is a structure schematic diagram of a network routing apparatus according to an embodiment of the present invention.
Figure 4:
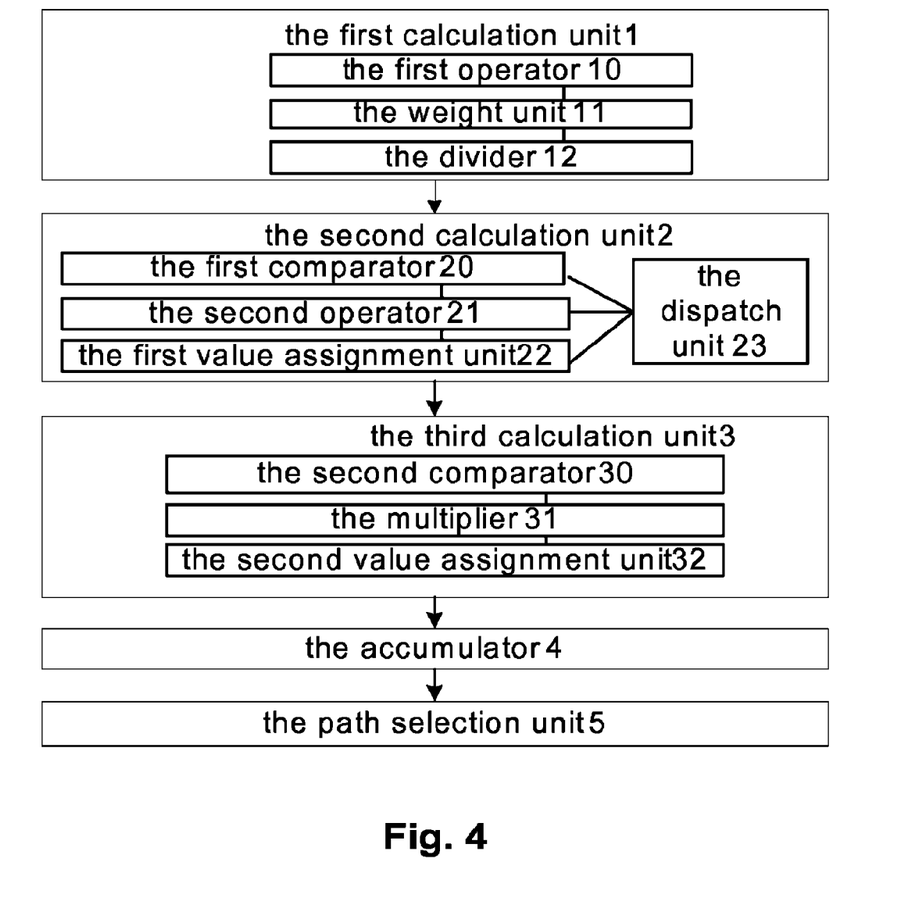
FIG. 4 is a structure schematic diagram of a network routing apparatus according to a preferred embodiment of the present invention.

FIG. 3 is a structure schematic diagram of a network routing apparatus according to an embodiment of the present invention. FIG. 4 is a structure schematic diagram of a network routing apparatus according to a preferred embodiment of the present invention. As shown in FIG. 3, the network routing apparatus according to the embodiment of the present invention comprises a first calculation unit 1, a second calculation unit 2, a third calculation unit 3, an accumulator 4 and a path selection unit 5. Each of the above units will be described in detail in conjunction with FIG. 4 hereinafter.

The first calculation unit 1 is adapted to calculate an average utilization rate of links of a whole network according to a bandwidth utilization rate of each link before bearing current service of multiple selectable paths corresponding to the current service and the number of the links.

Preferably, the average utilization rate of the links of the whole network can be calculated according to the formula (1) in the description of FIG. 1.

Preferably, as shown in FIG. 4, the first calculation unit 1 may further comprises: a first operator 10, which is adapted to calculate the bandwidth utilization rate of the link according to a residual bandwidth $R_{ij}$ and the maximum bandwidth $C_{ij}$ of the link; a weight unit 11, which is connected with the first operator 10 and adapted to accumulate the output of the first operator; and a divider 12, which is connected with the weight unit 11 and adapted to perform a division operation on the output of the weight unit and the number of the links included in the multiple selectable paths and take the output result of the division operation as the average utilization rate of the links of the whole network.

The second calculation unit 2 is connected with the first calculation unit 1 and adapted to calculate a bandwidth utilization rate of each link after bearing a service in each path.

Preferably, the bandwidth utilization rate of each link after bearing a service can be calculated according to the formula (2) in the description of FIG. 1.

Preferably, as shown in FIG. 4, the second calculation unit 2 may further comprise: a first comparator 20 which is adapted to compare a bandwidth b requested by the current service with the residual bandwidth $R_{ij}$ of a link; a second operator 21 which is connected with the first comparator 20 and adapted to perform an calculation according to the residual bandwidth $R_{ij}$ of the link, the bandwidth b requested by the current service and the maximum bandwidth $C_{ij}$ of the link when the output of the first comparator is $b \leq R_{ij}$, so as to acquire the bandwidth utilization rate of the link after bearing the current service; a first value assignment unit 22 which is connected with the first comparator and adapted to take a predetermined fixed value MAX_VALUE as the bandwidth utilization rate of the link after bearing the current service when the output of the comparator is $b > R_{ij}$; and a dispatch unit 23 which is connected with the first comparator 20, the second operator 21 and the first value assignment unit 22 and adapted to dispatch the second operator 21 and the first value assignment unit 22 according to the output of the first comparator 20.

The third calculation unit 3 is connected with the second calculation unit 2 and adapted to calculate a link balanced weight for each link according to the bandwidth utilization rate of the link after bearing the current service in each path and the average utilization rate of the links of the whole network.

Preferably, the link balanced weight can be calculated according to the formula (3) in the description of FIG. 1.

Preferably, as shown in FIG. 4, the third calculation unit 3 may further comprise: a second comparator 30 which is adapted to respectively compare a current bandwidth utilization rate $U_{ij}$ with any two of a predetermined initial threshold of the link bandwidth utilization rate $U_0$, the average utilization rate $\overline{U}$ of the links of the whole network, and a value 100; a multiplier 31 which is connected with the second comparator 30 and adapted to perform a multiplication operation on a value of a or the b and the current bandwidth utilization rate $U_{ij}$ according to the output of the second comparator, and take the output result as the link balanced weight; and a second value assignment unit 32 which is connected with the second comparator 30 and adapted to output the result of the second comparator, output an initial threshold $W_0$ of the link balanced weight or the MAX_VALUE, and take the output result of the multiplier, or the $W_0$, or the MAX-VALUE as the link balanced weight $W_{ij}$.

The accumulator 4 is connected with the third calculation unit 3 and adapted to accumulate respectively the link balanced weight of each link included in each path to obtain an accumulated load.

The path selector unit 5 is connected with the accumulator 4 and adapted to select a path with the minimum accumulated load as a bearing path for bearing the current service.

In the specific implementation process, the solution for realizing a network routing by the first calculation unit 1, the second calculation unit 2 and the third calculation unit 3, the accumulator 4 and the path selector 5 can be implemented by reference to the detailed description of FIG. 1 and FIG. 2, therefore, no more repeated description is given herein.

The network routing apparatus is provided in the embodiment above, wherein the following functions are realized through the units of the apparatus: calculating respectively the average utilization rate of the links of the whole network and the link bandwidth utilization rate for each service request, and dynamically setting the balanced weight of the link according to the above calculation result, so that the load balance among all the links in the whole network is realized.

In conclusion, the network routing solution provided by the embodiments of the present invention solves the problems that the network routing solution of the relate art for realizing the balanced load is complicated in algorithm and low in efficiency and is incapable of realizing the balanced load among the links of the whole network, and is capable of averagely distributing service risk and achieving a balanced load in the whole network, so as to achieve the balance and effective control on the network traffic. In addition, the network routing algorithm of the present invention is simple and efficient.

Apparently, it should be understood by those skilled in the art that the modules or steps of the present invention can be realized by a universal computing device, centralized on a single computing device or distributed on a network consisting of multiple computing devices, and optionally realized by executable program codes by a computing device, therefore, the modules or steps can be stored in a storage device to be executed by a computing device or separately manufactured into integrated circuit modules, or some of the modules or steps are manufactured into a single integrated circuit module. Thus, the invention is not limited to any special combination of hardware and software.

The mentioned above is only preferable embodiments of the present invention, not to limit the present invention. For those skilled in the art, various modification and variations of the present invention can be made. Any modification, equivalent changes and improvement without departing from the spirit and scope of the present invention should be included in the protection scope of the present invention.

What is claimed is:

1. A network routing method, comprising:
   for multiple selectable paths corresponding to current service, calculating an average utilization rate of links of a whole network according to a bandwidth utilization rate of each link before bearing the current service and the number of the links in the whole network, wherein each of the selectable paths includes at least one link;
   for each link in each of the selectable paths, calculating a bandwidth utilization rate of each link after bearing the current service;
   for each link in each of the selectable paths, setting a link balanced weight for each link according to the bandwidth utilization rate of said link after bearing the current service and the average utilization rate of the links of the whole network; and accumulating the link balanced weight of each link included in each of the selectable paths respectively to obtain accumulated loads, and selecting a path with the minimum accumulated load as a bearing path for bearing the current service.

2. The method according to claim 1, wherein the bandwidth utilization rate of the link after bearing the current service is calculated according to the following formula:

$$U_{ij} = \begin{cases} [1(R_{ij}b)/C_{ij}] \times 100 & b \le R_{ij} \\ \text{MAX\_VALUE} & b > R_{ij} \end{cases}$$

wherein $U_{ij}$ represents the bandwidth utilization rate of the link after bearing the current service; $R_{ij}$ represents a residual bandwidth of the link; $C_{ij}$ represents the maximum bandwidth of the link; b represents a bandwidth requested by the current service; MAX_VALUE represents a predetermined fixed value, wherein $R_{ij}$, $C_{ij}$, b and MAX_VALUE are all nonnegative numbers, and MAX_VALUE is an integer more than 100.

3. The method according to claim 1, wherein the average utilization rate of the links of the whole network is calculated according to the following formula:

$$\overline{U} = \left[\sum_{(i,j \in E)} (1 R_{ij}/C_{ij}) \times 100\right]/m$$

wherein $\overline{U}$ represents the average utilization rate of the links of the whole network, m represents the number of the links in the whole network, $R_{ij}$ represents a residual bandwidth of a link, and $C_{ij}$ represents the maximum bandwidth of the link.

4. The method according to claim 3, wherein the link balanced weight is set according to the following formula:

$$W_{ij} = \begin{cases} W_0 & (U_{ij} \le U_0) \\ aU_{ij} & (U_{ij} > U_0, \text{ and } U_{ij} \le \overline{U}) \\ bU_{ij} & (U_{ij} > U_0, \text{ and } U_{ij} > \overline{U}) \\ \text{MAX\_VALUE} & (U_{ij} > 100) \end{cases}$$

wherein $W_{ij}$ represents the link balanced weight, $U_0$ represents an initial threshold of the link bandwidth utilization rate of a link bearing the current service, $W_0$ represents a predetermined initial value of the link balanced weight, $U_0$, $W_0$, a and b are all nonnegative numbers, and a > $W_0/U_0$ and b > a.

5. The method according to claim 1, wherein if the current service is the first service accessed after a network is initialized, the average utilization rate of the links of the whole network is 0.

6. A network routing apparatus, comprising:
a first calculation unit, adapted to calculate an average utilization rate of links of a whole network according to a bandwidth utilization rate of each link before bearing current service of multiple selectable paths corresponding to the current service and the number of the links;
a second calculation unit, adapted to calculate a bandwidth utilization rate of each link after bearing the current service;
a third calculation unit, adapted to calculate a link balanced weight for each link according to the bandwidth utilization rate of the link after bearing the current service and the average utilization rate of the links of the whole network;
an accumulator, adapted to accumulate the link balanced weight of each link included in each of the selectable paths to obtain accumulated loads; and
a path selection unit, adapted to select a path with the minimum accumulated load as a bearing path for bearing the current service.

7. The apparatus according to claim 6, wherein the first calculation unit comprises:
a first operator, adapted to calculate and output the bandwidth utilization rate of the link before bearing the current service according to a residual bandwidth $R_{ij}$ of the link and the maximum bandwidth $C_{ij}$ of the link;
a weight unit, connected with the first operator, adapted to accumulate the output of the first operator and output the accumulated result; and
a divider, connected with the weight unit, adapted to perform a division operation on the output of the weight unit and the number of the links included in the multiple selectable paths, and take the output result of the division operation as the average utilization rate $\overline{U}$ of the links of the whole network.

8. The apparatus according to claim 6, wherein the second calculation unit comprises:
a first comparator, adapted to compare a bandwidth b requested by the current service with the residual bandwidth $R_{ij}$ of the link;
a second operator, connected with the first comparator, adapted to perform an calculation according to the residual bandwidth $R_{ij}$ of the link, the bandwidth b requested by the current service and the maximum bandwidth $C_{ij}$ of the link when the output of the first comparator is b≤$R_{ij}$, so as to obtain the bandwidth utilization rate of the link after bearing the current service;
a first value assignment unit, connected with the first comparator, adapted to take a predetermined fixed value MAX_VALUE as the bandwidth utilization rate of the link after bearing the current service when the output of the first comparator is b>$R_{ij}$; and
a dispatch unit, adapted to dispatch the second operator and the first value assignment unit according to the output of the first comparator.

9. The apparatus according to claim 8, wherein the third calculation unit comprises:
a second comparator, adapted to respectively compare a current link bandwidth utilization rate $U_{ij}$ with a predetermined initial threshold of the link bandwidth utilization rate $U_0$, the average utilization rate $\overline{U}$ of the links of the whole network, or a value 100;
a multiplier, connected with the second comparator and adapted to perform a multiplication operation on a value of a or the b and the current link bandwidth utilization rate $U_{ij}$ according to the output of the second comparator, and take the output result as the link balanced weight; and
a second value assignment unit, connected with the second comparator and adapted to output the result of the second comparator, output an initial threshold $W_0$ of the link balanced weight or the MAX_VALUE, and take the output result of the multiplier, or the $W_0$, or the MAX_VALUE as the link balanced weight $W_{ij}$.

10. The method according to claim 2, wherein the average utilization rate of the links of the whole network is calculated according to the following formula:

$$\overline{U} = \left[ \sum_{(i,j \in E)} (1 R_{ij} / C_{ij}) \times 100 \right] / m$$

wherein $\overline{U}$ represents the average utilization rate of the links of the whole network, m represents the number of the links in the whole network, $R_{ij}$ represents a residual bandwidth of a link, and $C_{ij}$ represents the maximum bandwidth of the link.

11. The method according to claim 10, wherein the link balanced weight is set according to the following formula:

$$W_{ij} = \begin{cases} W_0 & (U_{ij} \le U_0) \\ aU_{ij} & (U_{ij} > U_0, \text{ and } U_{ij} \le \overline{U}) \\ bU_{ij} & (U_{ij} > U_0, \text{ and } U_{ij} > \overline{U}) \\ \text{MAX\_VALUE} & (U_{ij} > 100) \end{cases}$$

wherein $W_{ij}$ represents the link balanced weight, $U_0$ represents an initial threshold of the link bandwidth utilization rate of a link bearing the current service, $W_0$ represents a predetermined initial value of the link balanced weight, $U_0$, $W_0$, a and b are all nonnegative numbers, and $a > W_0/U_0$ and $b > a$.

12. The apparatus according to claim 7, wherein the second calculation unit comprises:
a first comparator, adapted to compare a bandwidth b requested by the current service with the residual bandwidth $R_{ij}$ of the link;
a second operator, connected with the first comparator, adapted to perform an calculation according to the residual bandwidth $R_{ij}$ of the link, the bandwidth b requested by the current service and the maximum bandwidth $C_{ij}$ of the link when the output of the first comparator is $b \le R_{ij}$, so as to obtain the bandwidth utilization rate of the link after bearing the current service;
a first value assignment unit, connected with the first comparator, adapted to take a predetermined fixed value MAX_VALUE as the bandwidth utilization rate of the link after bearing the current service when the output of the first comparator is $b > R_{ij}$; and
a dispatch unit, adapted to dispatch the second operator and the first value assignment unit according to the output of the first comparator.

13. The apparatus according to claim 12, wherein the third calculation unit comprises:
a second comparator, adapted to respectively compare a current link bandwidth utilization rate $U_{ij}$ with a predetermined initial threshold of the link bandwidth utilization rate $U_0$, the average utilization rate $\overline{U}$ of the links of the whole network, or a value 100;
a multiplier, connected with the second comparator and adapted to perform a multiplication operation on a value of a or the b and the current link bandwidth utilization rate $U_{ij}$ according to the output of the second comparator, and take the output result as the link balanced weight; and
a second value assignment unit, connected with the second comparator and adapted to output the result of the second comparator, output an initial threshold $W_0$ of the link balanced weight or the MAX_VALUE, and take the output result of the multiplier, or the $W_0$, or the MAX_VALUE as the link balanced weight $W_{ij}$.

* * * * *